United States Patent
Jäger et al.

(10) Patent No.: US 8,226,032 B2
(45) Date of Patent: Jul. 24, 2012

(54) PIVOTING EQUIPMENT CARRIER IN COMBINATION WITH A MODIFIED LUGGAGE RACK

(75) Inventors: Hartwig Jäger, Jork (DE); Benjamin Bartels, Hamburg (DE); Gerd Rohlfs, Jork (DE)

(73) Assignee: Airbus Operations GmbH (DE)

( * ) Notice: Subject to any disclaimer, the term of this patent is extended or adjusted under 35 U.S.C. 154(b) by 260 days.

(21) Appl. No.: 12/666,675

(22) PCT Filed: May 21, 2008

(86) PCT No.: PCT/EP2008/056275
§ 371 (c)(1),
(2), (4) Date: May 14, 2010

(87) PCT Pub. No.: WO2009/003763
PCT Pub. Date: Jan. 8, 2009

(65) Prior Publication Data
US 2011/0006158 A1    Jan. 13, 2011

Related U.S. Application Data

(60) Provisional application No. 60/937,730, filed on Jun. 29, 2007.

(30) Foreign Application Priority Data

Jun. 29, 2007  (DE) .......................... 10 2007 030 330

(51) Int. Cl.
*B64C 1/22* (2006.01)
(52) U.S. Cl. .................... 244/118.1; 244/118.5; 312/248
(58) Field of Classification Search .............. 244/117 R, 244/118.1, 118.5; 312/204, 242, 245–248, 312/291–293.3; 248/317, 323, 324
See application file for complete search history.

(56) References Cited

U.S. PATENT DOCUMENTS

| | | | |
|---|---|---|---|
| 1,189,371 A | 7/1916 | Lyons | |
| 4,026,434 A | 5/1977 | Howard | |
| 4,458,296 A | 7/1984 | Bryant et al. | |
| 4,562,978 A | 1/1986 | Durbin et al. | |
| 4,720,622 A | 1/1988 | Iwata et al. | |
| 4,766,881 A | 8/1988 | Pax | |
| 4,845,591 A | 7/1989 | Pavie | |
| 4,860,973 A | 8/1989 | Fenner | |
| 5,096,271 A | 3/1992 | Portman | |
| 5,129,594 A | 7/1992 | Pease | |
| 5,170,320 A | 12/1992 | Pease | |

(Continued)

FOREIGN PATENT DOCUMENTS

DE           19633469 C1     9/1997

(Continued)

*Primary Examiner* — Tien Dinh
*Assistant Examiner* — Jamie S Stehle
(74) *Attorney, Agent, or Firm* — Lerner, David, Littenberg, Krumholz & Mentlik, LLP

(57) ABSTRACT

The present invention relates to a device for the installation of commercial components in an aircraft that features at least one equipment carrier for accommodating the components, wherein the at least one equipment carrier is arranged between a luggage rack and the skin of the aircraft and held on the aircraft structure such that it can be pivoted between a maintenance position and an installation position. In order to accommodate the commercial components in a space-saving fashion and to simplify the installation and maintenance work, the equipment carrier can be at least partially pivoted into the luggage rack and is accessible in order to perform installation and maintenance work from the luggage rack in the maintenance position.

13 Claims, 3 Drawing Sheets

U.S. PATENT DOCUMENTS

| | | |
|---|---|---|
| 5,190,241 A | 3/1993 | Pease |
| 5,306,077 A | 4/1994 | Trevaskis |
| 5,938,149 A | 8/1999 | Terwesten |
| 5,954,410 A | 9/1999 | Noellert |
| 6,073,624 A | 6/2000 | Laurent |
| 6,088,239 A | 7/2000 | Zeiss |
| 6,199,965 B1 | 3/2001 | Kanbe et al. |
| 6,484,969 B2 | 11/2002 | Sprenger et al. |
| 6,513,755 B1 | 2/2003 | Lambiaso |
| 6,857,603 B2 | 2/2005 | Lau et al. |
| 6,967,830 B2 | 11/2005 | Cooper et al. |
| 7,246,865 B1 | 7/2007 | Merrell, II |
| 7,726,606 B2 | 6/2010 | Graf et al. |
| 2002/0079792 A1 | 6/2002 | Nott et al. |
| 2004/0050569 A1 | 3/2004 | Leyda et al. |
| 2004/0140398 A1 | 7/2004 | Lau et al. |
| 2005/0236521 A1 | 10/2005 | Krause et al. |
| 2007/0095981 A1* | 5/2007 | Bock .................. 244/118.1 |
| 2008/0001031 A1 | 1/2008 | Doebertin et al. |
| 2008/0191093 A1 | 8/2008 | Benkart et al. |
| 2008/0273316 A1 | 11/2008 | Sarno et al. |
| 2008/0315036 A1 | 12/2008 | Wilcynski |
| 2009/0121080 A1* | 5/2009 | Feldkirchner et al. ..... 244/118.5 |
| 2009/0189017 A1 | 7/2009 | Jaeger et al. |
| 2010/0007253 A1 | 1/2010 | Ryerson |

FOREIGN PATENT DOCUMENTS

| | | |
|---|---|---|
| GB | 2318277 | 4/1998 |
| WO | 98/17531 | 4/1998 |
| WO | 03/024175 | 3/2003 |
| WO | 2009/003763 A1 | 1/2009 |

* cited by examiner

PIVOTING EQUIPMENT CARRIER IN COMBINATION WITH A MODIFIED LUGGAGE RACK

CROSS-REFERENCE TO RELATED APPLICATIONS

This application is a national phase entry under 35 U.S.C. §371 of International Application No. PCT/EP2008/056275, filed May 21, 2008, published in English, which claims the benefit of the filing date of U.S. Provisional Patent Application No. 60/937,730 filed Jun. 29, 2007, and of German Patent Application DE 10 2007 030 330.2 filed on Jun. 29, 2007, the disclosures of which are hereby incorporated herein by reference.

FIELD OF THE INVENTION

The present invention relates to a device for the installation of commercial components in an aircraft that features at least one equipment carrier for accommodating the components, wherein the at least one equipment carrier is arranged between a luggage rack and the skin of the aircraft and held on the aircraft structure such that it can be pivoted between a maintenance position and an installation position.

BACKGROUND OF THE INVENTION

U.S. Pat. No. 6,513,755 B1 discloses an equipment carrier that is held on the aircraft structure in a pivoting fashion, wherein access is gained by pivoting the equipment carrier downward after removing the panelling of the inner cabin panelling. However, it has shown that with known solutions it is not possible to optimally utilize the space available within an aircraft.

SUMMARY OF THE INVENTION

There may be an increasing demand on the part of airlines to realize the installation of so-called commercial equipment on board of an aircraft, wherein this commercial equipment can be separated from the avionic equipment, i.e., the components required for the actual operation of the aircraft. This commercial equipment may consist, for example, of electronic entertainment or communication components. In order to accommodate these components, depending on the type of aircraft different equipment carriers that are installed at different locations within the aircraft are used.

For example, in the longrange-type Airbus A330/A340, the preferred installations site is the region underneath the cockpit or the so-called E-Bay. In the Airbus A380, the equipment carriers are installed in the so-called Upper E-Bay. In the Airbus A320 of the so-called single-aisle-type, the equipment carriers are usually installed in the central luggage rack above the passengers. The equipment carrier usually consists of a housing that is fixed in a suspended or standing fashion on the aircraft structure with the aid of braces. The equipment carriers are connected to the electrical system and to the cooling system of the aircraft by standardized interfaces. But the access to the equipment carriers in order to perform installation and maintenance work may be relatively complicated. For example, the may require a correspondingly time-consuming and costly removal of sections of the cabin panelling. In addition, sufficient space may have to be provided laterally of the equipment carrier in order to gain access thereto.

The present invention is based on the possible need of making available a device that makes it possible to accommodate commercial equipment within an aircraft in a space-saving fashion and to easily access this equipment in order to perform installation and maintenance work.

According to an exemplary embodiment a device of the initially cited type is provided, in which the equipment carrier can be at least partially pivoted into the luggage rack and is accessible in order to perform installation and maintenance work from the luggage rack in the maintenance position.

One advantage of the inventive device can be seen in that it provides a simple option for accessing the equipment carrier, in which a removal of the ceiling or wall paneling is not required. Due to the pivoting movement, it may no longer be necessary to provide a certain clearance laterally adjacent to the equipment carrier for maintenance and installation purposes. Consequently, the space laterally adjacent to the equipment carrier can be optimally utilized, for example, for cable harnesses or air conditioning supply lines, particularly cooling lines, such that an improved economy of space can be achieved.

In one preferred exemplary embodiment, the equipment carrier is arranged above the central luggage rack because sufficient space for accommodating the components is available at this location. In addition, this region, that is also referred to as Crown Area, ensures that the components can be accessed independently of the partially different interior installations for seating, etc.

It is preferred in one exemplary embodiment that the upper side of the luggage rack is provided with a cutout, into which the equipment carrier can be pivoted in the maintenance position. Since installation and maintenance work is usually performed while the aircraft is not in use, the equipment carrier can be pivoted into the available space of the luggage rack such that this pivotability may always be ensured regardless of the other use of the already restricted structural space.

In one particularly preferred exemplary embodiment, the luggage rack features at least one luggage rack compartment that can be pivoted from a closed position into an open position and the equipment carrier is accessible in the maintenance position from the luggage rack compartment in its open position. The pivoted luggage rack compartment ensures that the luggage is securely accommodated during flying operations. Since it is possible to access the equipment carrier in the open position, the steps required for the maintenance work are reduced to a minimum.

In another preferred exemplary embodiment, the upper side of the luggage rack compartment is provided with a maintenance cover that can be opened and into which the equipment carrier can be partially pivoted. The maintenance cover does not affect the use of the luggage rack while the equipment carrier is situated in its installation position.

The maintenance cover can be removed so as to not affect the space within the luggage rack. This makes it possible to optimally pivot the equipment carrier.

In one preferred exemplary embodiment, the equipment carrier can be pivoted about an axis that extends parallel to the longitudinal axis of the aircraft and therefore corresponds to conventional pivoting mechanisms used in passenger aircraft in the region of the luggage racks such that its combination with and integration into other assemblies can be simplified.

In another preferred exemplary embodiment, the central luggage rack features, viewed in the lateral direction of the aircraft, two symmetric luggage rack compartments, between which a supply duct is arranged, wherein the supply duct is adapted to the pivoting movement of the equipment carrier and the equipment carrier is accessible from one of the two luggage rack compartments. This means that sufficient stowage space is available for the carry-on luggage of the passengers. At the same time, only one of the luggage rack compartments needs to be designed for enabling the pivoting movement of the equipment carrier. The space that is usually arranged between the luggage rack compartments in the longitudinal direction and used for supply lines only needs to be slightly reduced in its upper region in order to provide optimal access to the equipment carrier from one of the luggage rack compartments. In case components are movably arranged on the equipment carrier, they can be slidably pushed onto the equipment carrier from the accessible stowage compartment. Consequently, the maintenance of the components can be realized within a very short period of time such that the time window of 90 minutes provided between takeoff and landing can be easily observed.

In another preferred exemplary embodiment, a releasable latch is provided that holds the equipment carrier in the installation position in order to reliably divert loads to the aircraft structure in the installation position.

The equipment carrier may berealized in the form of a closed receptacle and provided with an access panel that is accessible in the maintenance position and removably attached with at least one quick-release fastener. The receptacle defines the space available for the components and also provides a certain protection for the components.

In another preferred exemplary embodiment, the equipment carrier is resistant to fire and impervious to smoke so as to ensure the highest level of safety by preventing the danger of the spread of smoke or fire originating from the components.

The luggage rack may consist of several modules and the equipment carrier is adapted to the module dimensions in order to ensure a largely optimal economy of space. In this case, the module dimensions usually correspond to the frame spacing, i.e., to the construction module of the aircraft structure. This makes it possible to divert the loads into the frames in a largely direct fashion via the pivoted suspension.

In order to provide as much space is possible for accommodating commercial components, several equipment carriers may be arranged in the longitudinal direction of the aircraft. Naturally, the inventive equipment carrier may also be used for accommodating other components.

BRIEF DESCRIPTION OF THE DRAWINGS

An exemplary embodiment of the invention is described in greater detail below with reference to the enclosed figures. The figures show.

DETAILED DESCRIPTION OF THE EXEMPLARY EMBODIMENT

Figure 1:
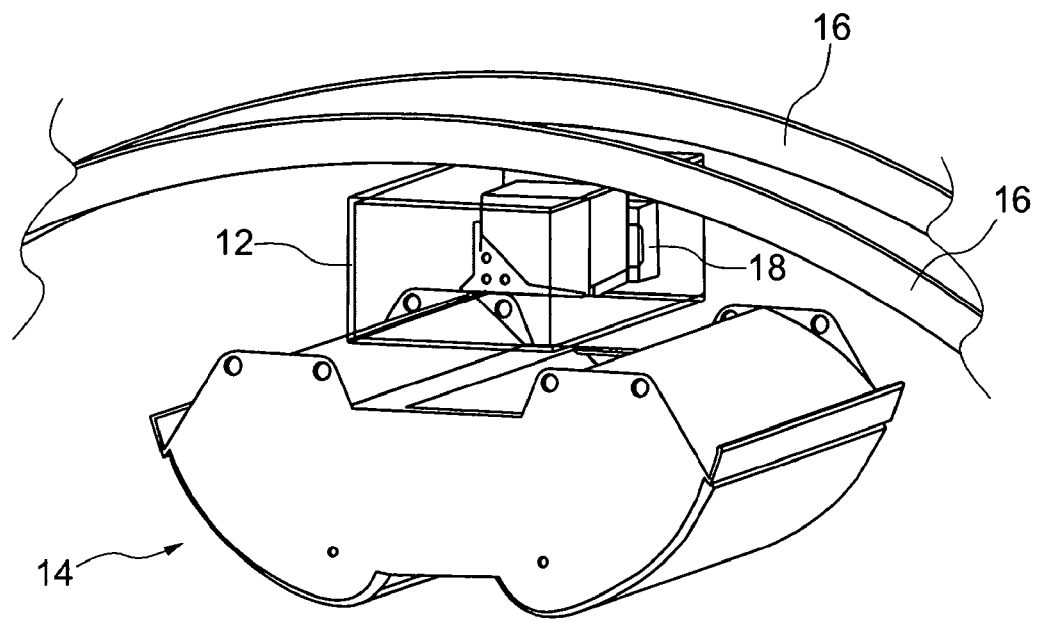
FIG. 1, an isometric representation of an equipment carrier between a central luggage rack above the passengers and the skin of an aircraft with indicated frames.

FIG. 1 schematically shows an exemplary equipment carrier 12 between a central luggage rack 14 and frames 16 of an aircraft structure in the form of an isometric representation. The equipment carrier serves for accommodating commercial components 18. Other components such as the skin of the aircraft that is fixed on the frames, the interior paneling or the entire infrastructural measures and constructive connecting means are not illustrated in order to provide a better overview.

Figures 2, 7:
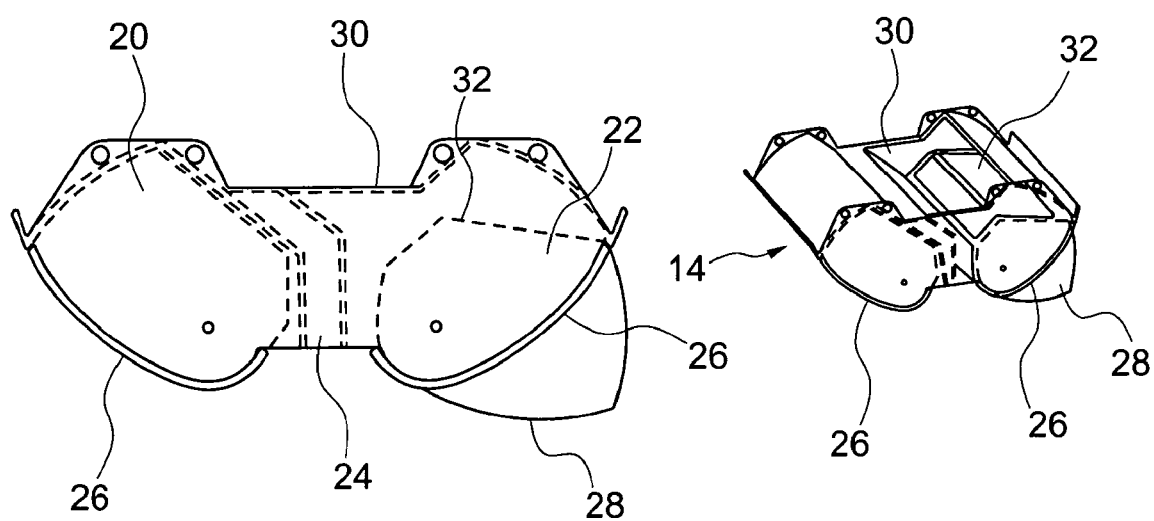
FIG. 2, a cross section through the luggage rack according to claim 1 with opened stowage compartment.
FIG. 7, an isometric representation of the luggage rack according to FIG. 2.

FIG. 2 shows a section through the luggage rack 14. The luggage rack 14 features two symmetrically arranged luggage rack compartments 20, 22, between which an installation duct 24 is arranged. The luggage rack compartments 20, 22 can be pivoted between a closed position 26, in which the left luggage rack compartment 20 is illustrated, and an open position 28 about a pivoting axis A1 (see FIG. 4), wherein the right luggage rack compartment 22 is illustrated in the open position 28 in an exemplary fashion.

The luggage rack 14 is realized in such a way that the equipment carrier 12 can be at least partially pivoted into the luggage rack 14, i.e., into the luggage rack compartment 22 in the embodiment shown. For this purpose, a cutout 30 is provided on the upper side of the luggage rack compartment 22, wherein the equipment carrier 12 can be pivoted into said cutout. The luggage rack compartment 22 is provided with a maintenance cover on its upper side that can be opened, wherein the maintenance cover can be removed such that the equipment carrier 12 can be pivoted into the luggage rack compartment 22.

Figure 3:
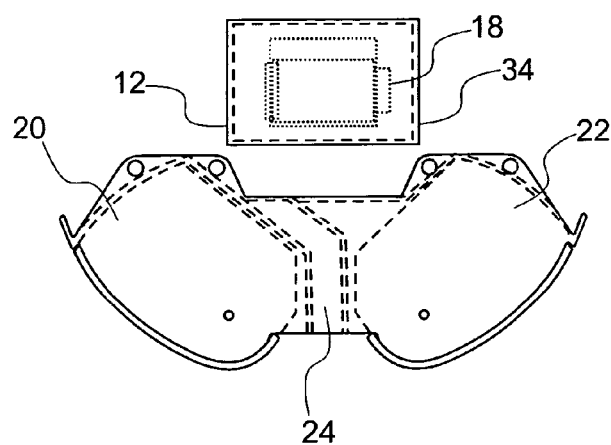
FIG. 3, a cross section through the luggage rack and the equipment carrier according to FIG. 1.
Figure 8:
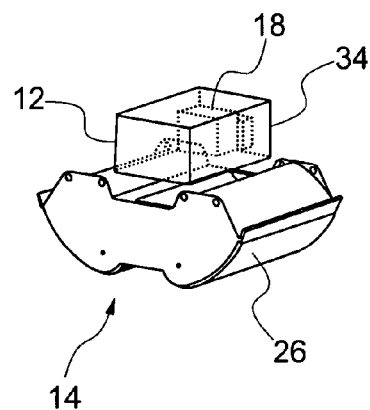
FIG. 8, an isometric representation of the luggage rack and the equipment carrier according to FIG. 3.

The equipment carrier 12 is held on the aircraft structure in a pivoting fashion and can be pivoted from an installation position 34 that is illustrated in FIG. 3 into a maintenance position 36 (see FIG. 5) about an axis A2. In the maintenance position 36, it is possible, for example, to subsequently re-install or reftrofit, repair or adjust the commercial components 18.

In the embodiment shown, the equipment carrier 12 consists of a closed receptacle that is resistant to fire and impervious to smoke such that defective components that, for example, could cause a short-circuit cannot result in fire spreading to the remaining aircraft or smoke produced by a scorching cable fire within the aircraft dispersing in the aircraft. In order to gain access to the region within the housing, the equipment carrier 12 is provided with a not-shown access panel with quick-release fasteners that are accessible in the maintenance position 36.

Figure 5:
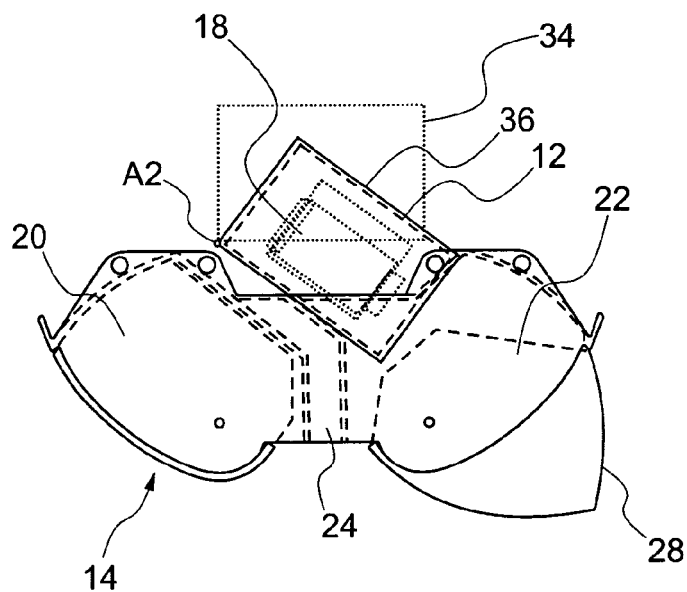
FIG. 5, a cross section through the luggage rack according to FIG. 4 with pivoted equipment carrier.
Figure 10:
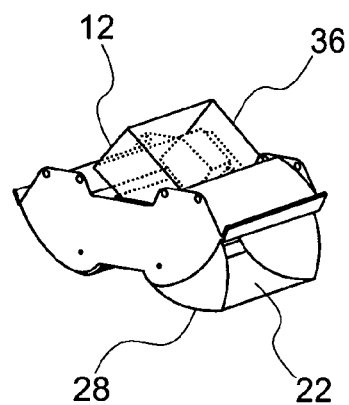
FIG. 10, an isometric representation of the luggage rack and the equipment carrier according to FIG. 5, and FIG. 11, an isometric representation of the luggage rack and the equipment carrier according to FIG. 6.

The pivoting axis A2 of the equipment carrier 12 extends parallel to the longitudinal axis of the aircraft and is situated on the lower left edge of the housing in FIG. 5. In order to securely hold the equipment carrier 12 in the installation position 34 and to divert loads into the aircraft structure, a releasable latch is provided that, however, is not illustrated in the figure.

Naturally, the equipment carrier 12 could also be held in a pivoting fashion on its other side, i.e., on its lower right edge or on the upper left or right edge, and pivoted into the luggage rack compartment 20.

The commercial components 18 are frequently installed on so-called racks 38, i.e., the individual components are combined on a plate-like structure. It proved to be particularly advantageous if the racks 38 can be inserted into receptacles provided in the equipment carrier 12 for this purpose. The commercial devices (18) can also be unfastened and removed individually, if so required. The connection is then realized, for example, with self-locating connectors on the brackets. For maintenance or replacement purposes, the racks 38 or the commercial components 18 can be simply removed and repaired or serviced outside the aircraft cabin. In order to realize this removal and reinsertion of the racks 38 or commercial components 18, the equipment carrier 12 can be pivoted into the luggage rack compartment 22 to such a degree that the entire lateral face of the equipment carrier 12 is situated within the luggage rack compartment 22. For this purpose, the installation duct 24 is modified in its upper region such that the equipment carrier 12 can also be pivoted into the zone between the two luggage rack compartments 20, 22 provided for the installation duct 24. According to FIG. 6, the installation duct 24 is sloped toward the left in its upper region in order to realize the pivoting movement of the equipment carrier 12. The rack 38 with the components 18 or the individual commercial components 18 can be pulled out obliquely downward in the form of a linear movement from the opened luggage rack compartment 22 and reinserted into the housing of the equipment carrier 12 in the reverse sequence (see FIG. 6).

Since the interior installations of aircraft are usually based on certain module dimensions, the luggage rack 14 usually also consists of several modules. This is the reason why the equipment carrier 12 is also adapted to the module dimensions such that certain advantages, for example, with respect to the mounting, the load introduction or the economy of space are achieved. Naturally, several equipment carriers 12 may also be arranged behind one another in the longitudinal direction of the aircraft.

The luggage rack 14 illustrated in the figures consists of a standard construction or a so-called Standard Hatrack that only is slightly modified in the region of the installation duct 24 and the luggage rack compartment 22. In other respects, the same conditions of compatibility apply, for example, to constructive transitions, the connection to supply lines or adjacent components of the interior installations.

Figure 4:
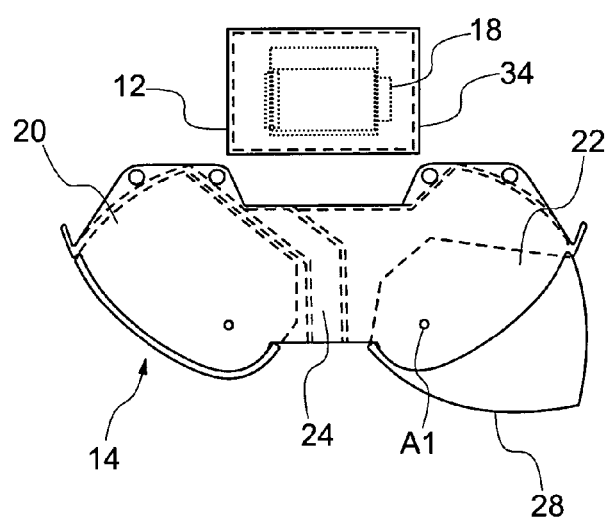
FIG. 4, a cross section through the luggage rack and the equipment carrier according to FIG. 1 with opened stowage compartment.
Figure 9:
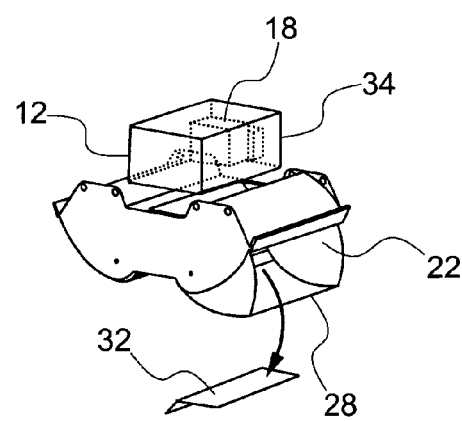
FIG. 9, an isometric representation of the luggage rack and the equipment carrier according to FIG. 4.
Figure 6:
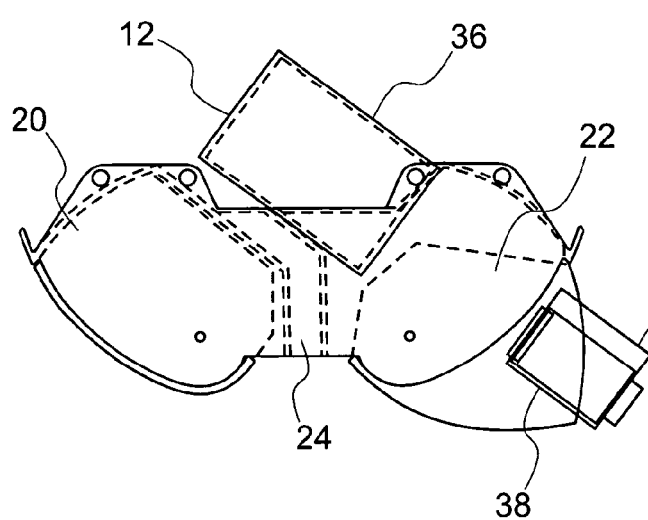
FIG. 6, a cross section through the luggage rack according to FIG. 5 with pushed-out component.
Figure 11:
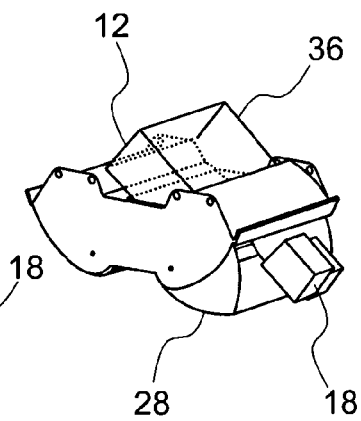

In order to access the commercial components 18, for example, so as to replace or recondition the components 18, the luggage rack compartment 22 is initially opened and the maintenance cover 32 is removed (FIG. 4). The equipment carrier 12 is then pivoted downward into the maintenance position 36 about the lower left edge after the releasable latch was disengaged (FIG. 5). Subsequently, the access panel is unfastened in order to gain access to the components 18. The latter then can, for example, be pushed out of the housing in the form of a rack 38 and removed through the luggage rack compartment 22 (FIG. 6). This sequence is also schematically illustrated in the isometric representations according to FIGS. 8 to 11. The installation is realized by carrying out these steps in the reverse sequence.

Since the equipment carrier 12 is accessible through the opened luggage rack compartment 22 when it is pivoted into the maintenance position 36, it is no longer necessary to provide a certain clearance laterally adjacent to the equipment carriers 12. This space adjacent to the equipment carriers can be used for the cooling system or the electrical system. The components 18 can be removed with only a few manipulations and without requiring the removal of larger components.

As a supplement, it should be noted that "comprising" does not exclude any other elements or steps and that "a" or "an" does not exclude a plurality. It should furthermore be noted that characteristics or steps that were described with reference to one of the above embodiments can also be used in combination with other characteristics or steps of other above-described embodiments. The reference symbols in the claims should not be interpreted in a restrictive sense.

The invention claimed is:

1. A device for the installation of commercial components in an aircraft having a luggage rack, said device comprising:
   at least one equipment carrier for accommodating the components,
   wherein the at least one equipment carrier is arranged between the luggage rack and the skin of the aircraft and held on the aircraft structure and configured to be pivoted between a maintenance position such that a lateral face thereof is at least partially situated within the luggage rack compartment and an installation position, and
   wherein the equipment carrier is configured to be at least partially pivoted into the luggage rack and is accessible in order to perform installation and maintenance work from the luggage rack in the maintenance position.

2. The device of claim 1, wherein the equipment carrier is arranged above the luggage rack.

3. The device of claim 2, wherein an upper side of the luggage rack comprises a cutout thereon and the equipment carrier can be pivoted into said cutout in the maintenance position.

4. The device of claim 3, wherein the luggage rack comprises at least one luggage rack compartment that can be pivoted from a closed position into an open position, and wherein the equipment carrier is accessible in the maintenance position from the luggage rack in the open position.

5. The device of claim 4, wherein the upper side of the luggage rack compartment includes a maintenance cover that can be opened.

6. The device of claim 5, wherein the maintenance cover is removable.

7. The device of claim 1, wherein the equipment carrier can be pivoted about an axis that extends parallel to the longitudinal axis of the aircraft.

8. The device of claim 7, wherein the luggage rack includes, viewed in the lateral direction of the aircraft, two symmetric luggage rack compartments, between which a supply duct is arranged, wherein the supply duct is adapted to the pivoting movement of the equipment carrier and the equipment carrier is accessible from one of the two luggage rack compartments.

9. The device of claim 1, further comprises a releasable latch for holding the equipment carrier in the installation position.

10. The device of claim 1, wherein the equipment carrier configured as a closed receptacle and further comprises an access panel that is accessible in the maintenance position and removably attached with at least one quick-release fastener.

11. The device of claim 10, wherein the equipment carrier is resistant to fire and impervious to smoke.

12. The device of claim 1, wherein the luggage rack includes a plurality of modules and the equipment carrier is adapted to the module dimensions.

13. The device of claim 12, wherein a plurality of equipment carriers is arranged in the longitudinal direction of the aircraft.

* * * * *